(12) United States Patent
DeAngelis

(10) Patent No.: US 6,649,069 B2
(45) Date of Patent: Nov. 18, 2003

(54) ACTIVE ACOUSTIC PIPING

(75) Inventor: Matthew M. DeAngelis, Bedford, NH (US)

(73) Assignee: BAE Systems Information and Electronic Systems Integration Inc, Nashua, NH (US)

(*) Notice: Subject to any disclaimer, the term of this patent is extended or adjusted under 35 U.S.C. 154(b) by 0 days.

(21) Appl. No.: 10/308,318

(22) Filed: Dec. 3, 2002

(65) Prior Publication Data

US 2003/0136745 A1 Jul. 24, 2003

Related U.S. Application Data

(60) Provisional application No. 60/351,145, filed on Jan. 23, 2002.

(51) Int. Cl.⁷ .............. C02F 1/36; B06B 1/06; F16L 55/00

(52) U.S. Cl. .......... 210/748; 422/20; 422/128; 366/DIG. 4; 138/103

(58) Field of Search .............. 210/748; 422/20, 422/128; 366/DIG. 4; 367/157, 159; 138/103

(56) References Cited

U.S. PATENT DOCUMENTS

| | | | |
|---|---|---|---|
| 3,055,209 A | 9/1962 | Reid et al. | |
| 3,170,152 A | 2/1965 | Long | |
| 3,264,864 A | 8/1966 | Reid et al. | |
| 3,967,282 A | 6/1976 | Young et al. | |
| 4,013,905 A | 3/1977 | Breneman et al. | |
| 4,062,010 A | 12/1977 | Young et al. | |
| 4,168,295 A * | 9/1979 | Sawyer | 422/111 |
| 4,172,382 A | 10/1979 | Murphy et al. | |
| 4,220,887 A | 9/1980 | Kompanek | |
| 4,326,954 A * | 4/1982 | Shroyer | 210/222 |
| 4,600,356 A | 7/1986 | Bridges et al. | |
| 4,649,948 A | 3/1987 | Hudson | |
| 4,651,044 A | 3/1987 | Kompanek | |
| 4,728,368 A * | 3/1988 | Pedziwiatr | 134/1 |
| 5,020,035 A | 5/1991 | Kompanek | |
| 5,027,644 A | 7/1991 | Ziolkowski et al. | |
| 5,101,774 A | 4/1992 | Marziale et al. | |
| 5,220,538 A | 6/1993 | Flanagan et al. | |
| 5,229,978 A | 7/1993 | Flanagan et al. | |
| 5,256,920 A | 10/1993 | Porzio | |
| 5,267,223 A | 11/1993 | Flanagan et al. | |
| 5,395,592 A * | 3/1995 | Bolleman et al. | 422/128 |
| 5,526,690 A | 6/1996 | Louie et al. | |
| 5,639,667 A | 6/1997 | Heslot et al. | |
| 5,711,350 A | 1/1998 | Eisinger | |
| 6,065,350 A * | 5/2000 | Hill et al. | 73/861.27 |
| RE37,204 E | 6/2001 | Kompanek | |

FOREIGN PATENT DOCUMENTS

| | | | |
|---|---|---|---|
| EP | 0465878 | * | 1/1992 |
| WO | WO 00/03207 | | 1/2000 |

* cited by examiner

Primary Examiner—Fred G. Prince
(74) Attorney, Agent, or Firm—Maine & Asmus

(57) ABSTRACT

Active acoustic piping that allows treatment of material flowing in a piping system is disclosed. Treatment of waste water and other fluids is enabled, where acoustic radiation operates on the flow material. An inner pipe has a plurality of transducer elements disposed on its external perimeter. A buffer zone around the transducer elements provides an acoustic impedance mismatch, which concentrates the acoustic energy into the flow material traveling in the inner pipe. Processes such as decontamination, flow unclogging, fluid and particulate mixing, particulate size reduction, and particulate separation are enabled. No pressure compensation scheme is required.

22 Claims, 4 Drawing Sheets

ACTIVE ACOUSTIC PIPING

RELATED APPLICATIONS

This application claims the benefit of U.S. Provisional Application No. 60/351,145, Jan. 23, 2002, which is herein incorporated in its entirety by reference.

FIELD OF THE INVENTION

The invention relates to a piping system, and more particularly, to an active acoustic piping technique for delivering acoustical impulses into materials flowing within a pipe.

BACKGROUND OF THE INVENTION

There are a number of applications that utilize acoustics in piping systems. For example, piping systems can employ acoustics for locating faults (e.g., leaks or corrosion) in the piping of a system, measuring internal dimensions of the pipes of a system, and monitoring the material flowing through a pipe.

In general, conventional systems adapted for such applications introduce pressure fluctuations into a piping system for diagnostic purposes. For example, by providing a known pressure pulse to a piping system and then measuring the pressure at a point downstream, a determination can be made as to whether the system has leaks. Typical mechanisms for producing the desired pressure fluctuations are linear actuation methods aimed down the pipe, or a number of linear actuators located about the circumference of the pipe.

However, there appears to be no piping actuation method that uses a single or multiple cylindrical actuators to operate on the fluid media flowing within a piping system. Moreover, the conventional linear actuators are typically bulky, and may not fit the form of an existing cylindrical pipe. Nor are they designed to produce acoustic power sufficient for functions such as decontamination, flow unclogging, fluid and particulate mixing, or particulate size reduction.

What is needed, therefore, are techniques for performing functions such as acoustic decontamination, flow unclogging, fluid and particulate mixing, or particulate size reduction in a piping system.

BRIEF SUMMARY OF THE INVENTION

One embodiment of the present invention provides an active acoustic piping apparatus for processing flow material. The apparatus includes an inner pipe having an external perimeter and a center, and a transducer layer disposed around the inner pipe's external perimeter. The transducer layer is adapted for receiving power from an alternating supply and providing acoustic energy. The apparatus further includes a buffer zone around the transducer layer. The buffer zone is adapted to provide an acoustic impedance mismatch, thereby concentrating acoustic energy from the transducer layer into the inner pipe's center. The apparatus can be adapted to operate with acoustic energy on matter flowing through a piping system to perform at least one of pipe flow unclogging, fluid decontamination, fluid and particulate separation, fluid and particulate mixing, and reducing particulate size.

In one such embodiment, the external perimeter of the inner pipe is coated with an acoustic absorbing material so as to facilitate absorption of acoustic energy into the inner pipe's center. The transducer layer and the inner pipe can be slotted in one or more locations, thereby providing a corresponding nodal region opposite each slot where heavier flow material will tend to settle. The inner pipe can have an oval shape defining a short and a long axis, and a slot on the short axis. In such an embodiment, the nodal region is wider than that of a circular pipe. Alternatively, the transducer layer and the inner pipe are slotless, thereby providing a quad nodal region.

The buffer zone around the transducer layer can be, for example, an air chamber. In one such embodiment, the apparatus further includes an outer shell disposed around the transducer layer, wherein the air chamber buffer zone is maintained between the outer shell and the transducer layer with standoffs. The outer shell has an internal surface that can be coated with an acoustic reflecting material. Alternatively, the buffer zone around the transducer layer can be a material (e.g., potting material) having an acoustic impedance that inhibits outward projection of acoustic energy.

Another embodiment of the present invention provides a method for processing flow material traveling through a piping system. The method includes flowing the flow material through an inner pipe having an external perimeter and a center, and providing acoustic energy into the pipe with a plurality of transducer elements disposed around the external perimeter of the inner pipe. The method further includes concentrating the acoustic energy into the inner pipe's center by providing an acoustic impedance mismatch with a buffer zone around the plurality of transducer elements. The flow material can be operated on by the acoustic energy, where the method further includes at least one of pipe flow unclogging, fluid decontamination, fluid and particulate separation, fluid and particulate mixing, and reducing particulate size. In one particular embodiment, the method includes mixing the flow material by providing a plurality of out of phase nodal regions. Alternatively, the method includes separating particulates included in the flow material by providing a consistent nodal region where heavier particles settle.

Another embodiment of the present invention provides a method for manufacturing an apparatus adapted for processing flow material traveling through a piping system. The method includes providing an inner pipe having an external perimeter and a center. The method further includes disposing a plurality of transducer elements around the inner pipe. The transducer elements are adapted for providing acoustic energy. The method further includes providing a buffer zone around the plurality of transducer elements. The buffer zone is adapted for concentrating the acoustic energy into the inner pipe's center by providing an acoustic impedance mismatch.

In one embodiment, the method further includes coating the external perimeter of the inner pipe with an acoustic absorbing material so as to facilitate the absorption of acoustic energy into the inner pipe's center. In another embodiment, the method further includes providing a slot in the plurality of transducer elements disposed around the inner pipe, thereby enabling a corresponding nodal region opposite the slot where heavier flow material will settle.

In one particular embodiment, the buffer zone around the plurality of transducer elements is an air chamber. In such a case, the method further includes disposing an outer shell around the plurality of transducer elements, and maintaining the air chamber buffer zone between the outer shell and the plurality of transducer elements with standoffs. The outer shell has an internal surface, and the method may further include coating the internal surface with an acoustic reflecting material. In another particular embodiment, providing the buffer zone around the plurality of transducer elements includes disposing a material (e.g., potting material) having an acoustic impedance that inhibits outward projection of acoustic energy around the plurality of transducer elements.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

An active acoustic piping apparatus adapted for applications such as food and beverage production, transport and storage of waste water, transfer and processing of chemicals or other fluids (e.g., refining and oil industry) is disclosed herein. The apparatus is configured to introduce acoustical impulses into fluids and/or material flowing in the pipe so as to cause the likes of decontamination, flow unclogging, fluid and particulate mixing, particulate size reduction, and particulate separation.

Figure 1A:
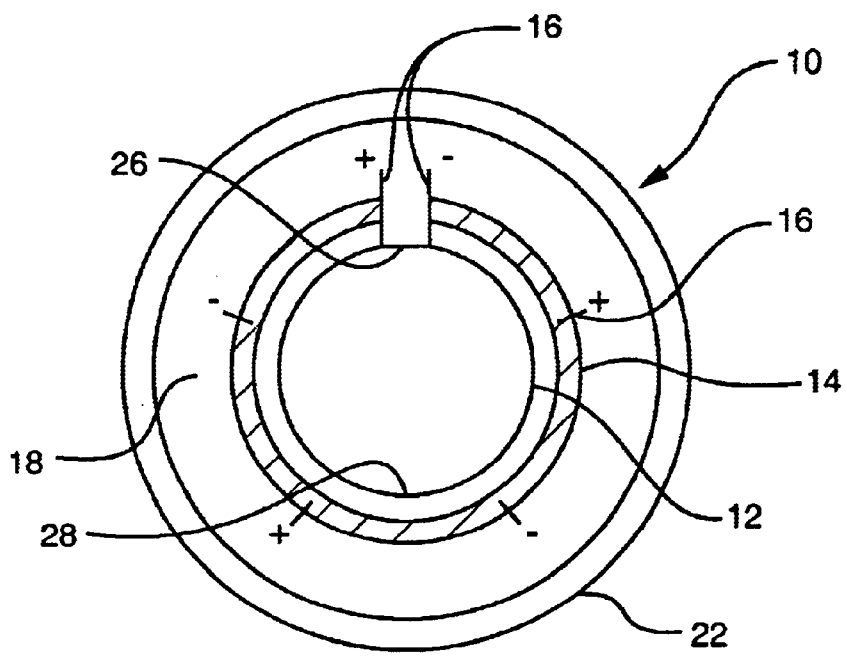
FIG. 1A is a cross-sectional end view of an active acoustic piping apparatus in accordance with one embodiment of the present invention.
Figure 1B:
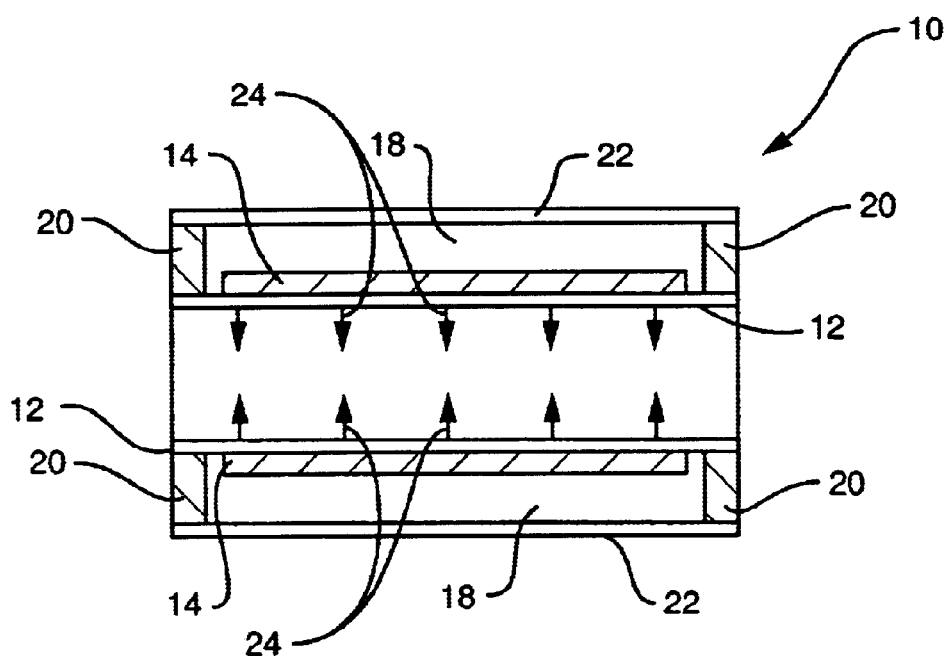
FIG. 1B is a cross-sectional side view of the active acoustic piping apparatus shown in FIG. 1A.

FIGS. 1A and 1B each illustrate cross-sectional views of an active acoustic piping apparatus in accordance with one embodiment of the present invention. The apparatus 10 includes an inner pipe 12 having a transducer layer 14 disposed around its external perimeter. The transducer layer 14 is configured with a plurality of active transducer elements, and electrodes 16 so that the active elements can be actuated by an alternating supply (not shown). A buffer zone 18 is maintained between the outer shell 22 and the transducer layer 14 with standoffs through the use of standoffs 20 or other supportive material (e.g., potting material).

The inner pipe 12 can be made from a material that is resistant to the fluid being treated/transported, such as a polymer, steel, aluminum, graphite, fiberglass, or a composite. The plurality of active transducer elements of the transducer layer 14 may include, for example, at least one of piezoelectric elements, ferroelectric elements, and rare earth elements. The elements can be configured to operate, for instance, in the d31 or d33 modes. The elements are configured (e.g., positive and negative electrodes) to receive power from an alternating source. Generally stated, the acoustical power generated by the transducer elements increases as the number of elements increases. As the inner pipe 12 parameters of wall thickness and/or diameter increase, the more transducer elements that should be disposed about the pipe.

The outer shell 22 can be made of materials similar to those from which the inner pipe 12 might be made. This outer shell can be sealed so as to protect the transducer layer 14 and electrodes from the outside environment. The standoffs 20 prevent the transducer layer 14 from contacting the outer shell 22. In alternative embodiments, the outside of pipe 12, including the transducer layer 14 and electrodes 16, can be potted with, for example, a urethane or polyurethane. In such embodiments, the outer shell 22 is effectively formed by the potting material rather than a second outer cylinder. In any case, the transducer layer 14 and electrodes 16 are protected. As such, applications where the piping system is buried or otherwise subjected to environment conditions, will not pose a substantial threat to the componentry of the apparatus.

The external perimeter of the pipe 12 can be coated with an acoustic energy absorbing material such as closed cell foam to facilitate absorption of acoustic energy. In addition, a buffer zone 18 provides an acoustic impedance mismatch, thereby concentrating acoustic energy 24 into the center of the pipe 12. The impedance mismatch effectively provides an acoustic barrier and inhibits outward projection of the acoustic energy. Generally, an acoustic impedance mismatch of one or more orders of magnitude between the transducer layer 14 and the external surrounding area will inhibit acoustic energy from projecting outwardly.

In one embodiment, the outer shell 22 is a sealed second cylinder, so that buffer zone 18 is an air chamber. Note that air has an acoustic impedance that is relatively low as compared to the acoustic impedance of, for example, ceramic, aluminum, steel, or plastic. The inner surface of the outer shell 22 can be coated with an acoustic reflecting material to further prevent outward projection of acoustic energy. In another embodiment, the buffer zone 18 can be a layer of potting material such as urethane or polyurethane, or other material having an acoustic impedance that inhibits outward projection of acoustic energy. In one such embodiment, the buffer zone 18 between the outer shell 22 and the inner pipe 12 is substantially filled with a supportive, buffering material thereby eliminating the need for standoffs 20 (such as shown in FIG. 1A).

The inner pipe 12 and/or transducer layer 14 can be configured with a slot 26, but need not be depending on the particular application. Providing a slot 26 will produce a nodal region 28 where relatively little motion may occur, which is generally opposite the slot 26. Providing a slot 26 will also enable a lower resonant frequency of operation as compared to slotless transducer layer 14 having the same dimensions, thereby enabling larger particle movement.

In one example embodiment, a transducer layer 14 made up of ceramic piezoelectric elements is disposed over a 10 inch wide section of a circular, steel inner pipe having a 12 inch outer diameter and a wall thickness of 1 inch. Each element has a height of about 1.0 inches (extending outward from the perimeter of the pipe 12), a width of about 3.5 inches (extending towards the ends of pipe 12), and a thickness of about 0.25 inches. The slot 26 is approximately 4 inches in length (radial), and about 3 inches in height. A corresponding nodal region 28 of about 4 inches is provided opposite the slot 26. Numerous configurations are possible, and the particular configuration should be selected based on the given application.

In alternative embodiments, an oval shaped inner pipe 12 can also be employed to provide a lower frequency of operation, as well as a wider nodal region. In particular, a slotted oval inner pipe 12 can be provided, where the slot is configured on the short axis of the oval. In such a configuration, the nodal region opposite the slot 26 will be relative wider than that in a circular pipe because of the elongated sides of the oval that run parallel to the long axis of the oval.

In fluid separation and particle removal applications, the more dense material traveling in inner pipe 12 will tend to settle in nodal region 28 of the pipe. Thus, after material has flowed through a length of pipe configured with a nodal region 28, a split can be integrated into the pipe system so as to perform the desired separation of light from dense material. Likewise, a catch can be integrated into the pipe system so as to perform the desired removal of light or dense material. A stage of such nodal regions 28 can be provided so that a specific particle type or range of particle types are isolated in the inner pipe.

For example, consider a flow have particle sizes A, B, C, and D, ranging from largest to smallest. A piping system can be configured in accordance with the principles of the present invention to split off or remove particle sizes A, B, and D, where a first stage is configured to split off or remove the smallest particle size D, thereby leaving C as the smallest remaining particle size. A second stage could then split off or remove the largest particle size A, thereby leaving B as the largest remaining particle size. A third stage could then split off or remove particle size B, thereby leaving C as the last remaining particle size in the pipe.

A number of alternative configurations are possible in light of this disclosure. For instance, the transducer layer 14 need not run the whole length of the inner pipe 12 or a section thereof. Rather, the transducer layer 14 can be disposed in an alternating fashion, with X inches of populated section followed by Y inches of non-populated section followed by X inches of populated section, and so on. Electrical wire can be used to couple one electrode 16 to the next electrode over a non-populated section of the inner pipe 12.

In addition, more than one slot 26 can be configured to provide multiple nodal regions 28. A multiple nodal configuration can be used, for example, in a mixing application. One such embodiment is illustrated in FIG. 2.

Figure 2:
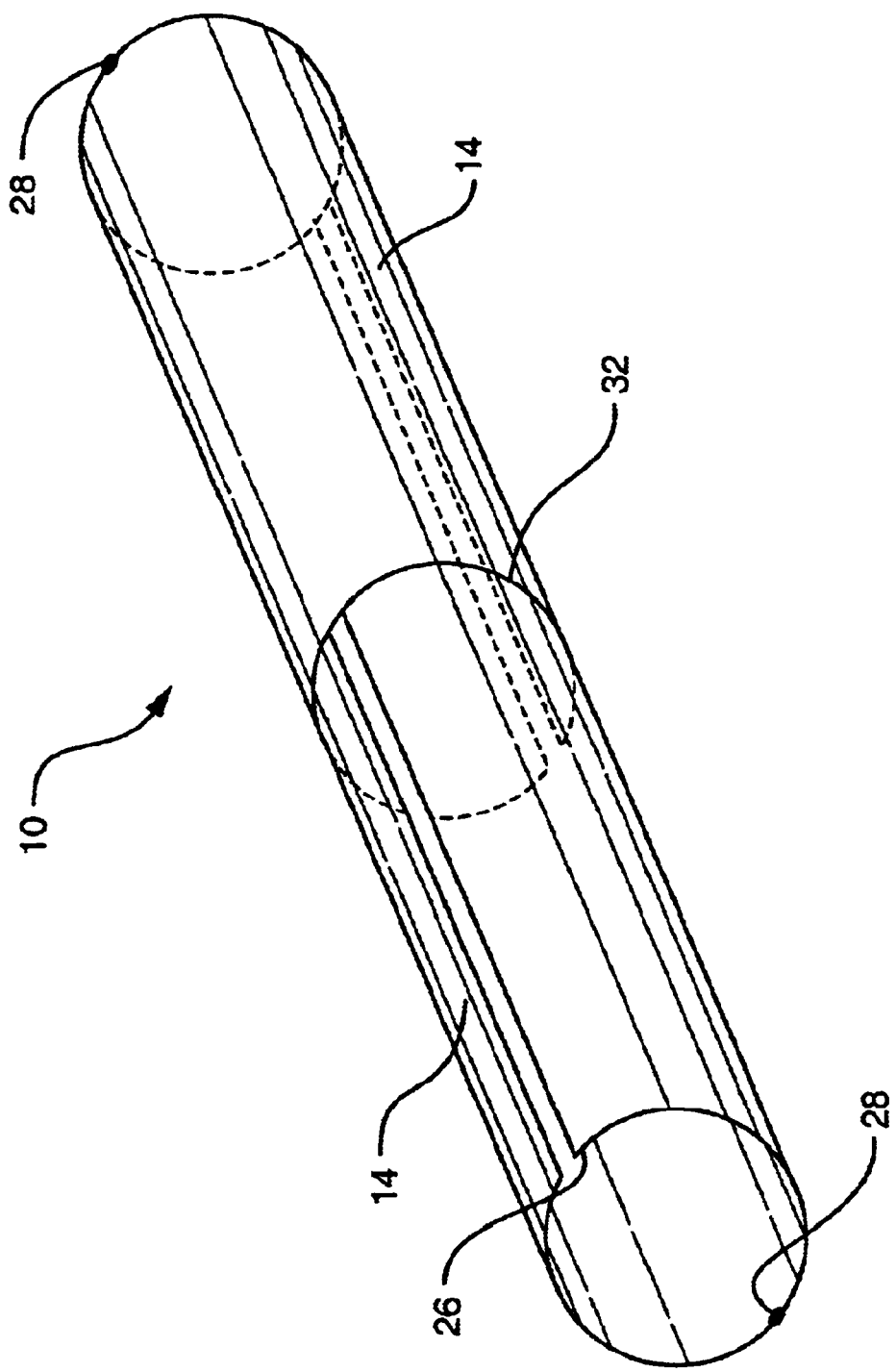
FIG. 2 is a perspective view of an active acoustic piping apparatus in accordance with another embodiment of the present invention.

FIG. 2 is a perspective view of an active acoustic piping apparatus in accordance with another embodiment of the present invention. In particular, a first transducer layer 14 having a first slot 26 is coupled adjacent to a second transducer layer 14 having a second slot 26 that is configured at about 180 degrees opposite the first slot. Such a configuration inhibits settling in the inner pipe on which the first and second transducer layers 14 are disposed.

The contents flowing through the inner pipe will therefore be subjected to a pair of out of phase nodal regions 28 that cause a nodal region change over point 32. As such, the flow through the inner pipe will transition from a laminar state to a turbulent state as the velocity of the flow is interrupted at point 32. In addition, denser material will effectively be forced to transition from the first nodal region 28 to the second nodal region 28. Similarly, lighter material will be forced to transition from second nodal region 28 to the first nodal region 28.

Thus, there is a resulting mixing effect at the nodal region change over point 32. The effect continues for a distance after the change over point 32, as the flow begins to settle. If the nodal region change over point 32 is repeated a number of times in the given pipe, a mixing zone is created. The flow passing through this zone will remain in a turbulent or mixed state for that portion until a more laminar flow can be re-established outside the mixing zone. A flow catch can be integrated into the piping system to harvest the mixed flow at an appropriate point before separation or settling occurs.

Figure 3:
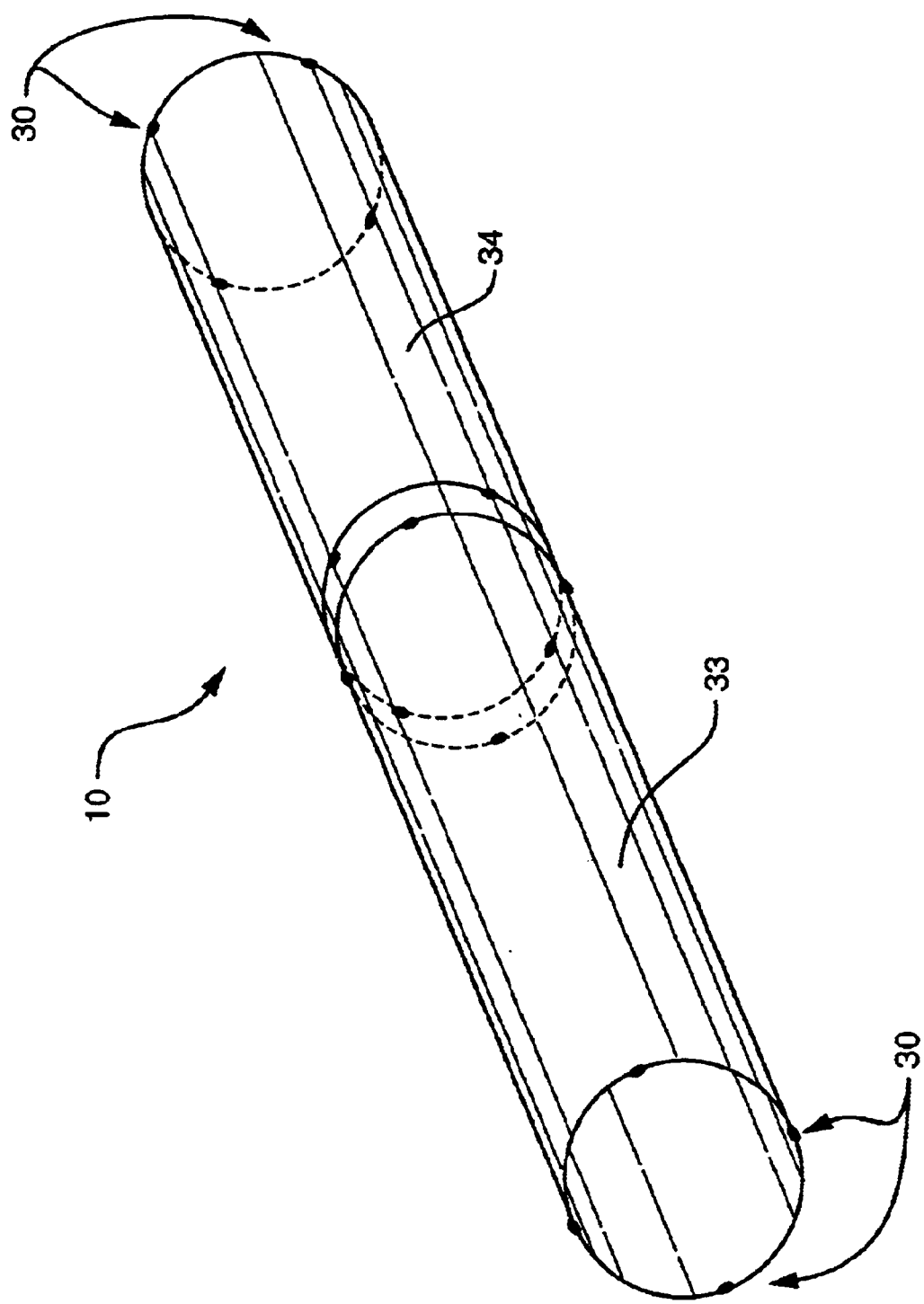
FIG. 3 is a perspective view of an active acoustic piping apparatus in accordance with another embodiment of the present invention.

FIG. 3 is a perspective view of an active acoustic piping apparatus in accordance with another embodiment of the present invention. In this embodiment, a first unslotted transducer layer 14 is provided on a first pipe section 33, and a second unslotted transducer layer 14 is provided on a second pipe section 34. Unslotted transducer layers 14 enable four nodal regions 30 as shown, which is generally referred to herein as a quad nodal region.

The pipe sections 33 and 34 are joined such that the their respective nodal regions 30 are not aligned. In one particular embodiment, the first pipe section 33 and the second pipe section 34 are coupled so that there is a nodal section 30 about every 45 degrees of the inner pipe. Such a quad nodal region configuration provides a robust spiral flow, and may be used, for example, to effect rapid flow mixing.

In one embodiment, the transducer layer 14 is comprised entirely of transduction material such as piezoelectric ceramic or rare earth material. Outer shell 22 may also be used, but need not be if the likes of the transducer layer 14 and the electrodes 16 are properly protected.

A method of obtaining intimate contact between the inner pipe 12 and the transducer layer 14 is to have the outer diameter of the inner pipe 12 slightly larger than the inner diameter of the transducer layer 14. A slot of the inner pipe 12, which can be covered with a flexible membrane to prevent flow leakage, can be compressed during the manufacturing process so the transducer layer 14 can slide over the inner pipe 12. The pipe 12 can then be released so a robust contact is made. Support bands or an additional shell can be placed around the outer diameter of the transducer layer 14 for additional support, or to add pre-stress on the transducer layer 14. This added support and pre-stress eliminate the need for pressure compensation. Alternatively, the transducer layer 14 can be bonded to the external surface of the inner pipe 12. The thickness of the inner pipe 12 can vary depending on the application. Note, however, that the thicker the inner pipe 12, the more acoustic power that will be necessary to effectively operate on the material flowing inside the pipe 12.

Figure 4:
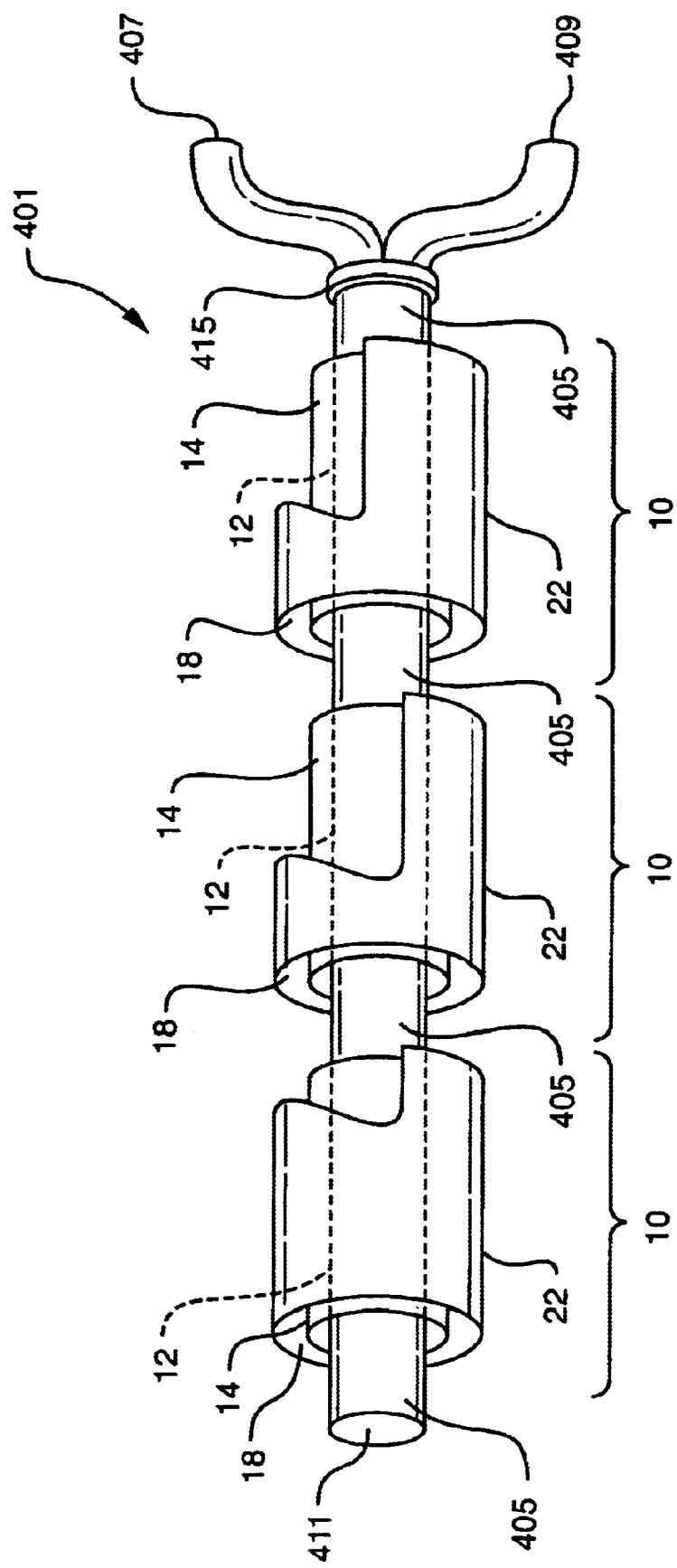
FIG. 4 illustrates an active acoustic piping system in accordance with one embodiment of the present invention.

In any case, the apparatus is adapted for integration into a piping system. One such system is illustrated in FIG. 4. In this particular embodiment, the system 401 includes three adjacent active acoustic piping apparatuses 10 that are each operatively coupled in-line to a pipe 405. Elements of apparatuses 10 are discussed in detail with reference to FIGS. 1A, 1B, 2, and 3. Band clamps or other suitable connecting mechanisms can be used to couple the inner pipes 12 to the system pipe 405 when integrating the apparatus 10 into the system. Note that alternative embodiments may have a plurality of apparatuses 10 as shown so as to provide a plurality of active sections separated by non-active sections, or one single apparatus 10 so as to provide one continuous active section that operates on flow material. A splitter/combiner 415 is also provided in the piping system 401.

Depending on the direction of flow, this particular system can be employed for applications such as mixing or particle separation. For example, if the flow travels from 411 to 407 and 409, a separation application can be provided. In such a case, each of the active acoustic piping apparatuses 10 can be configured with a slot 26 (FIG. 1A), with each slot 26 aligned so as to form a consistent nodal region down the length of the pipe. As previously explained, the heavier material included in the flow will tend to settle in the nodal region. At the exit of the piping system, the lighter material will therefore be separated by splitter 415 and provided to, for example, 407, while the heavier remaining material will be received at 409. Alternatively, the heavier remaining material may be left settled in the nodal region of the pipe, and can be harvested or otherwise removed (e.g., by flushing) after the lighter material is harvested. Alternatively, the heavier remaining material left settled in the nodal region of the pipe can be subjected to high frequency vibration during a subsequent breakdown process. Once the breakdown process is completed, a flushing and or new separation process can be performed. Such processes can be repeated as necessary.

In another example, if the flow travels from 407 and 409 to 411, a mixing application can be provided. In this case, each of the active acoustic piping apparatuses 10 can again be configured with a slot 26, with each slot 26 configured 180 degrees out of phase with the adjacent slot 26 so as to form a varying nodal region down the length of the pipe, such as shown in FIG. 2. Alternatively, each of the apparatuses 10 can be slotless so as to provide four nodal regions, with each quad nodal region about 45 degrees out of phase with the adjacent quad nodal region so as to form a varying (more specifically, spiraling) nodal region down the length of the pipe, such as shown in FIG. 3.

In either case, a flow material of a first type can be received into 407, with flow material of a second type received into 409. The different material types are then combined into pipe 405 by combiner 415. As the combined materials flow through the system 401, they are mixed by virtue of the varying nodal region. A mixed solution is provided at 411.

In a given piping system 401, the active sections of piping that are being treated can have thinner walls (e.g., less than 1.0 inch) than the non-active, untreated sections so that the generated acoustic energy can more readily be transferred into the center of the pipe. For the active sections of the line, the inner pipe 12 can be a projector material that is suited for the application. The non-active sections, pipe 405, can be that which is typically used in the given piping system.

Thus, embodiments of the present invention provide one or more active piping sections that can be used for treating fluid media passing through a pipe. A buffer zone 18 produces an acoustic impedance mismatch between the inner pipe and the buffer zone. This impedance mismatch concentrates acoustic radiation into the inner pipe 12, thus increasing the effectiveness and efficiency of the acoustic piping system.

General applications include pipe flow unclogging, fluid decontamination, fluid and particulate separation, fluid and particulate mixing, and reducing particulate size, all with acoustic energy produced by the acoustic transducer operatively coupled to the pipe flowing the target material. Specific applications might include sewage treatment (e.g., breakdown and separation of solids during transport to facility thereby reducing necessary holding tank time); water filtration, biological waste removal and processing (e.g., frequency of vibration can be used to kill or immobilize biological organisms in the flow material); and food and beverage, processing at chemical plants, and oil refining (e.g., clog removing and element separation).

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An active acoustic piping apparatus for processing flow material, the apparatus comprising:

an inner pipe having an external perimeter and a center;

a transducer layer disposed around the inner pipe's external perimeter, the transducer layer adapted for receiving power from an alternating supply and providing acoustic energy; and a buffer zone around the transducer layer, adapted to provide an acoustic impedance mismatch, thereby concentrating acoustic energy from the transducer layer into the inner pipe's center.

2. The apparatus of claim 1 wherein the apparatus is adapted for integration into a piping system.

3. The apparatus of claim 1 wherein the apparatus is adapted to operate with acoustic energy on matter flowing through a piping system to perform at least one of pipe flow unclogging, fluid decontamination, fluid and particulate separation, fluid and particulate mixing, and reducing particulate size.

4. The apparatus of claim 1 wherein the external perimeter of the inner pipe is coated with an acoustic absorbing material so as to facilitate absorption of acoustic energy into the inner pipe's center.

5. The apparatus of claim 1 wherein the transducer layer and the inner pipe are slotted in one or more locations, thereby providing a corresponding nodal region opposite each slot where heavier flow material will settle.

6. The apparatus of claim 1 wherein the inner pipe has an oval shape defining a short and a long axis, and a slot on the short axis.

7. The apparatus of claim 1 wherein the transducer layer and the inner pipe are slotless, thereby providing a quad nodal region.

8. The apparatus of claim 1 wherein the inner pipe is made from a polymer, steel, aluminum, graphite, fiberglass, or a composite.

9. The apparatus of claim 1 wherein the transducer layer includes at least one of piezoelectric elements, ferroelectric elements, and rare earth elements.

10. The apparatus of claim 1 wherein the buffer zone around the transducer layer is an air chamber, the apparatus further comprising:

an outer shell disposed around the transducer layer, wherein the air chamber buffer zone is maintained between the outer shell and the transducer layer with standoffs.

11. The apparatus of claim 10 wherein the outer shell has an internal surface that is coated with an acoustic reflecting material.

12. The apparatus of claim 1 wherein the buffer zone around the transducer layer is a material having an acoustic impedance that inhibits outward projection of acoustic energy.

13. A method for processing flow material traveling through a piping system, the method comprising:

flowing the flow material through an inner pipe having an external perimeter and a center;

providing acoustic energy with a plurality of transducer elements disposed around the external perimeter of the inner pipe; and concentrating the acoustic energy into the inner pipe's center by providing an acoustic impedance mismatch with a buffer zone around the plurality of transducer elements.

14. The method of claim 13 wherein the flow material is operated on by the acoustic energy and the method further includes at least one of pipe flow unclogging, fluid decontamination, fluid and particulate separation, fluid and particulate mixing, and reducing particulate size.

15. The method of claim 13 further including mixing the flow material by providing a plurality of out of phase nodal regions.

16. The method of claim 13 further including separating particulates included in the flow material by providing a nodal region where heavier particles settle.

17. A method for manufacturing an apparatus adapted for processing flow material traveling through a piping system, the method comprising:

providing an inner pipe having an external perimeter and a center;

disposing a plurality of transducer elements around the inner pipe, the transducer elements adapted for providing acoustic energy; and providing a buffer zone around the plurality of transducer elements adapted for concentrating the acoustic energy into the inner pipe's center by providing an acoustic impedance mismatch.

18. The method of claim 17 further comprising coating the external perimeter of the inner pipe with an acoustic absorbing material so as to facilitate the absorption of acoustic energy into the inner pipe's center.

19. The method of claim 17 further comprising providing a slot in the plurality of transducer elements disposed around the inner pipe, thereby enabling a corresponding nodal region opposite the slot where heavier flow material will settle.

20. The method of claim 17 wherein the buffer zone around the plurality of transducer elements is an air chamber, the method further comprising:

disposing an outer shell around the plurality of transducer elements; and maintaining the air chamber buffer zone between the outer shell and the plurality of transducer elements with standoffs.

21. The method of claim 20 wherein the outer shell has an internal surface, the method further comprising coating the internal surface with an acoustic reflecting material.

22. The method of claim 20 wherein providing the buffer zone around the plurality of transducer elements includes disposing a material having an acoustic impedance that inhibits outward projection of acoustic energy around the plurality of transducer elements.

* * * * *